United States Patent Office 3,154,396
Patented Oct. 27, 1964

3,154,396
SYNERGISTIC HERBICIDAL COMPOSITION
AND METHOD
Edward D. Weil, Lewiston, Jack S. Newcomer, Wilson, and Edwin Dorfman, Grand Island, N.Y., assignors to Hooker Chemical Corporation, Niagara Falls, N.Y., a corporation of New York
No Drawing. Filed Aug. 20, 1959, Ser. No. 834,920
4 Claims. (Cl. 71—2.5)

This invention relates to a synergistic herbicidal composition. More specifically this invention resides in a novel herbicidal composition comprising 2,3,6-trichlorophenylacetic acid and 2-chloro-4,6-bis(ethylamino)-s-triazine. This application is a continuation-in-part of co-pending application Serial Number 692,046, filed in the United States Patent Office on October 24, 1957, now abandoned.

The herbicidal mixtures of this invention possess new and unobvious properties not logically predictable from the individual activities of the ingredient compounds. The surprising effect of this mixture is that the ingredient compounds enhance the effect of each other. Thus applicants have found that the composition of this invention is more herbicidally active than would be expected on the basis of the additivity of the two ingredient compounds.

As a herbicide, it is particularly useful in places where it is undesirable to have plant growth such as along railroad right of ways, highway guard rails, pipelines, etc. Soil sterilization of this type in the prior art has been quite costly and a major need exists for soil sterilants which are effective and yet economical. The composition of this invention because of the desirable activities of its components and because of the large degree of synergism between the two compounds provides such a sterilant.

2,3,6-trichlorophenylacetic acid alone and 2-chloro-4,6-bis(ethylamino)-s-triazine alone both are capable of controlling the emergence of weeds from the soil over considerable periods of time ranging up to two years after application, depending on the rates of application but when used individually are costly for many such applications. Combinations of 2,3,6-trichlorophenylacetic acid or its derivatives with 2-chloro-4,6-bis(ethylamino)-s-triazine are far more herbicidally active than would be expected on the basis of additivity and the cost of the mixtures of the invention to accomplish such weed control is substantially less than the cost of other individual herbicides at rates to produce the same degree of control.

It is intended when applicants refer to 2,3,6-trichlorophenylacetic acid that not only is the acid meant to be covered but also are its herbicidal salt or hydrolyzable derivatives such as an ester, thioester, iminoester, iminohalide, thiamide, halide, anhydride, thioanhydride, or amide thereof. The rates however, for convenience sake will be given throughout this disclosure in the terms of the acid. It is preferred to use the composition of this invention in aqueous solutions (preferably in the form of a salt, such as the sodium salt), or as dry solids. Solid carriers such as clay, a borate mineral or vermiculite may also be included when the dry formulation is used. Formulations may contain emulsifying agents, such as sorbitol laurates, wetting agents, and carriers in accordance with the well-established practices in the herbicidal field. Combinations of this herbicide with other known herbicides which may or may not be involved in the synergistic effect may be used without departing from the spirit of this invention.

It will be evident to those skilled in the art, following this disclosure, that certain homologs of 2-chloro-4,6-bis(ethylamino)-s-triazine which are known to produce qualitatively similar phytotoxic effects and which differ principally in their water-solubility, may be substituted for 2-chloro-4,6-bis(ethylamino)-s-triazine without substantially deviating from the present invention: these homologs being 2-chloro-4-isopropylamino-6-ethylamino-s-triazine, 2-chloro-4-isopropylamino-6-methylamino-s-triazine, and 2-chloro-4,6-bis(isopropylamino)-s-triazine. Other closely related triazine herbicides having methoxy groups in place of the chlorine atoms have performed similarly under the conditions of the invention.

The synergism between 2,3,6-trichlorophenylacetic acid and 2-chloro-4,6-bis(ethylamino)-s-triazine has been observed to be present at ratios of 1:4 to 4:1, being large at ratios of 1:2 and 2:1 and to become progressively less effective at ratios to either side of the above range. It would not, however, deviate from the spirit of this invention to use any combination of components desired for a particular need. For economic reasons, we prefer to employ 2-chloro-4,6-bis(ethylamino)-s-triazine and the 2,3,6-trichlorophenylacetic acid at rates of 1–40 pounds per acre of each component. The 2,3,6-trichlorophenylacetic acid may be prepared as described in our co-pending application S.N. 692,046; the 2-chloro-4,6-bis(ethylamino)-s-triazine may be prepared by the method of Pearlman and Banks, J. Am. Chem. Soc. 70, 3726 (1948).

The following examples will further illustrate the present invention.

Example 1

A representative formulation of the compositions of the invention is as follows:

| | Parts by weight |
|---|---|
| 2,3,6-trichlorophenylacetamide | 50 |
| 2-chloro-4,6-bis(ethylamino)-s-triazine | 50 |
| Inert carrier (attapulgus clay or chalk) | 50 |
| Marasperse (sodium lignosulfonate, a commercial dispersing agent) | 2.5 |
| Sorbit-P (sodium alkylnaphthalene sulfonate, a commercial wetting agent) | 2.5 |

These constituents are ground to a fine powder which can be readily dispersed in a water with slight agitation.

A similar formuation was made as above only sodium 2,3,6-trichlorophenylacetate was used in place of the 2,3,6-trichlorophenylacetic acid.

Example 2

The following example illustrates the synergistic effect of the composition of this invention.

A test area in Erie·County, Now York, infested with quackgrass, wild carrot, chicory, dock, weed plantain, ragweed, oxalin, daisy, yarrow, foxtail, hedge bind, and mustard was sprayed with an aqueous suspension of the type described in Examples 1 and 2. One year later the treated area was inspected for weed control with the following observation:

| Chemical | Pounds Applied | Average Weed Control [1] percent |
|---|---|---|
| Sodium 2,3,6-triclorophenyl-acetate | (5) | 0–5 |
| 2,3,6-trichlorophenylacetamide | (5) | 0–5 |
| 2-chloro-4,6-bis(ethylamino)-s-triazine | (2.5) | 38 |
| Sodium 2,3,6-trichlorophenylacetate 2-chloro-4,6-bis(ethylamino)-s-triazine. | (1.25) plus | 70 |
| Do | (2.5) plus (2.5). | 95 |
| Do | (5) plus (2.5). | 95 |

[1] Reduction of weed population of test plot relative untreated control plot.

While specific amounts have been illustrated by the examples, it is to be understood that various amounts of the 2,3,6-trichlorophenylacetic acid and 2-chloro-4,6-bis- (ethylamino)-s-triazine may be used depending on existing conditions and desired results.

The examples which have been described in the foregoing specification have been given for purposes of illustration, not limitation. Many other modifications and ramifications will naturally suggest themselves to those skilled in the art, based on the disclosure of our basic discovery. These are intended to be comprehended within the scope of our invention.

We claim:

1. A synergistic herbicidal composition comprising from four to one parts of 2,3,6-trichlorophenylacetic acid and from one to four parts of 2-chloro-4,6-bis(ethylamino)-s-triazine, said components being present in such amount as to exert herbicidal activity.

2. The method of controlling the growth of plant life which comprises applying to the locus to be treated a phytotoxic amount of a synergistic combination of 2,3,6-trichlorophenylacetic acid and 2-chloro-4,6-bis(ethylamino)-s-triazine.

3. The method of controlling the growth of plant life which comprises applying to the locus to be treated a phytotoxic amount of a composition containing from one to four parts of 2,3,6-trichlorophenylacetic acid and from one to four parts of 2-chloro-4,6-bis(ethylamino)-s-triazine.

4. The method of controlling the growth of plant life which comprises applying to the locus to be treated in combination 2,3,6-trichlorophenylacetic acid and 2-chloro-4,6-bis(ethylamino)-s-triazine at rates of from one to forty pounds per acre of each.

References Cited in the file of this patent

UNITED STATES PATENTS

| | | |
|---|---|---|
| 2,394,916 | Jones | Feb. 12, 1946 |
| 2,444,905 | Sexton | July 13, 1948 |
| 2,891,855 | Gysin et al. | June 23, 1959 |
| 2,977,212 | Tischler | Mar. 28, 1961 |

OTHER REFERENCES

Trevett et al. in "Proc. Northeast, Weed Control Conf.," January 1958, pages 368 to 373.

Flanagan in "Proceedings, Northeastern Weed Control Conference," Jan. 7, 8, 9, 1959, pages 232 to 238.

Tafuro in "Proc. Northeast, Weed Control Conf.," January 1959, pages 423 to 429.

UNITED STATES PATENT OFFICE
CERTIFICATE OF CORRECTION

Patent No. 3,154,396                                  October 27, 1964

Edward D. Weil et al.

It is hereby certified that error appears in the above numbered patent requiring correction and that the said Letters Patent should read as corrected below.

Column 2, line 42, for "formuation" read -- formulation --; line 48, for "Now" read -- New --; lines 49 and 50, for "dock, weed plantain, ragweed, oxalin, daisy, yarrow, foxtail, hedge bind," read -- dock, ragweed, plantain, oxalis, daisy, yarrow, foxtail, hedge bindweed, --; same column 2, Example 2 in the table, second column, fourth line thereof, for "(1.25) plus" read -- (1.25) plus (2.5) --.

Signed and sealed this 1st day of June 1965.

(SEAL)
Attest:

ERNEST W. SWIDER
Attesting Officer

EDWARD J. BRENNER
Commissioner of Patents